(12) United States Patent
Mandin et al.

(10) Patent No.: US 8,102,851 B1
(45) Date of Patent: Jan. 24, 2012

(54) END-OF-BURST DETECTION FOR UPSTREAM CHANNEL OF A POINT-TO-MULTIPOINT LINK

(75) Inventors: Jeff Mandin, Jerusalem (IL); Valentin Ossman, Netanya (IL)

(73) Assignee: PMC-Sierra Israel Ltd., Herzliya Pituach (IL)

( * ) Notice: Subject to any disclaimer, the term of this patent is extended or adjusted under 35 U.S.C. 154(b) by 169 days.

(21) Appl. No.: 12/464,956

(22) Filed: May 13, 2009

(51) Int. Cl.
*H04L 12/28* (2006.01)
*H04L 12/56* (2006.01)
*H04B 10/20* (2006.01)
(52) U.S. Cl. ............. 370/390; 370/442; 398/58; 398/72
(58) Field of Classification Search .................. 370/270, 370/390, 422, 425, 442; 398/58, 63, 67, 398/68, 70–72
See application file for complete search history.

(56) References Cited

U.S. PATENT DOCUMENTS

| | | | |
|---|---|---|---|
| 6,430,230 B1 * | 8/2002 | Cunningham et al. | 375/292 |
| 6,775,274 B1 * | 8/2004 | Ain et al. | 370/360 |
| 7,680,414 B2 * | 3/2010 | Kazawa et al. | 398/67 |
| 2002/0171895 A1 * | 11/2002 | Chang | 359/168 |
| 2005/0135365 A1 * | 6/2005 | Sung et al. | 370/390 |
| 2005/0163149 A1 * | 7/2005 | Unitt et al. | 370/442 |
| 2008/0144622 A1 * | 6/2008 | Platnic | 370/390 |
| 2008/0310861 A1 * | 12/2008 | Wong et al. | 398/210 |
| 2009/0261997 A1 * | 10/2009 | Diab | 341/100 |

* cited by examiner

*Primary Examiner* — Robert Scheibel
*Assistant Examiner* — Saba Tsegaye
(74) *Attorney, Agent, or Firm* — Mark M. Friedman

(57) ABSTRACT

A method of signaling and detecting end-of-transmission on a data communications link that uses scrambling comprises, by a transmitting node of the network, appending an end of burst delimiter (EBD) binary sequence to burst data and transmitting the burst data and the EBD over the communication link to a headend of the network. In a 10 G EPON using a 64B/66B transmission code, the EBD is exemplarily a 198 bit pattern.

7 Claims, 5 Drawing Sheets

| Input Data | Sync | | Block Payload | | | | | | | | |
|---|---|---|---|---|---|---|---|---|---|---|---|
| Bit Position: | 0 | 1 | 2 | | | | | | | | 65 |
| Data Block Format: | | | | | | | | | | | |
| $D_0 D_1 D_2 D_3 D_4 D_5 D_6 D_7$ | 0 | 1 | $D_0$ | $D_1$ | $D_2$ | $D_3$ | $D_4$ | $D_5$ | $D_6$ | $D_7$ | |
| Control Block Formats: | | | Block Type Field | | | | | | | | |
| $C_0 C_1 C_2 C_3 C_4 C_5 C_6 C_7$ | 1 | 0 | 0x1e | $C_0$ | $C_1$ | $C_2$ | $C_3$ | $C_4$ | $C_5$ | $C_6$ | $C_7$ |
| $C_0 C_1 C_2 C_3 C_4 / O_4 D_5 D_6 D_7$ | 1 | 0 | 0x2d | $C_0$ | $C_1$ | $C_2$ | $C_3$ | $O_4$ | $D_5$ | $D_6$ | $D_7$ |
| $C_0 C_1 C_2 C_3 / S_4 D_5 D_6 D_7$ | 1 | 0 | 0x33 | $C_0$ | $C_1$ | $C_2$ | $C_3$ | | $D_5$ | $D_6$ | $D_7$ |
| $D_0 D_1 D_2 D_3 / S_4 D_5 D_6 D_7$ | 1 | 0 | 0x66 | $D_0$ | $D_1$ | $D_2$ | $D_3$ | | $D_5$ | $D_6$ | $D_7$ |
| $D_0 D_1 D_2 D_3 / O_4 D_5 D_6 D_7$ | 1 | 0 | 0x55 | $D_0$ | $D_1$ | $D_2$ | $D_3$ | $O_4$ | $D_5$ | $D_6$ | $D_7$ |
| $S_0 D_1 D_2 D_3 D_4 D_5 D_6 D_7$ | 1 | 0 | 0x78 | | $D_1$ | $D_2$ | $D_3$ | $D_4$ | $D_5$ | $D_6$ | $D_7$ |
| $O_0 D_1 D_2 D_3 / C_4 C_5 C_6 C_7$ | 1 | 0 | 0x4b | $O_0$ | $D_1$ | $D_2$ | $D_3$ | $C_4$ | $C_5$ | $C_6$ | $C_7$ |
| $T_0 C_1 C_2 C_3 / C_4 C_5 C_6 C_7$ | 1 | 0 | 0x87 | | $C_1$ | $C_2$ | $C_3$ | $C_4$ | $C_5$ | $C_6$ | $C_7$ |
| $D_0 T_1 C_2 C_3 / C_4 C_5 C_6 C_7$ | 1 | 0 | 0x99 | $D_0$ | | $C_2$ | $C_3$ | $C_4$ | $C_5$ | $C_6$ | $C_7$ |
| $D_0 D_1 T_2 C_3 / C_4 C_5 C_6 C_7$ | 1 | 0 | 0xaa | $D_0$ | $D_1$ | | $C_3$ | $C_4$ | $C_5$ | $C_6$ | $C_7$ |
| $D_0 D_1 D_2 T_3 / C_4 C_5 C_6 C_7$ | 1 | 0 | 0xb4 | $D_0$ | $D_1$ | $D_2$ | | $C_4$ | $C_5$ | $C_6$ | $C_7$ |
| $D_0 D_1 D_2 D_3 / T_4 C_5 C_6 C_7$ | 1 | 0 | 0xcc | $D_0$ | $D_1$ | $D_2$ | $D_3$ | | $C_5$ | $C_6$ | $C_7$ |
| $D_0 D_1 D_2 D_3 / D_4 T_5 C_6 C_7$ | 1 | 0 | 0xd2 | $D_0$ | $D_1$ | $D_2$ | $D_3$ | $D_4$ | | $C_6$ | $C_7$ |
| $D_0 D_1 D_2 D_3 / D_4 D_5 T_6 C_7$ | 1 | 0 | 0xe1 | $D_0$ | $D_1$ | $D_2$ | $D_3$ | $D_4$ | $D_5$ | | $C_7$ |
| $D_0 D_1 D_2 D_3 / D_4 D_5 D_6 T_7$ | 1 | 0 | 0xff | $D_0$ | $D_1$ | $D_2$ | $D_3$ | $D_4$ | $D_5$ | $D_6$ | |

FIG. 1 PRIOR ART

END-OF-BURST DETECTION FOR UPSTREAM CHANNEL OF A POINT-TO-MULTIPOINT LINK

FIELD OF THE INVENTION

The invention relates generally to data access systems, and more particularly to the operation of a communication system that uses a DC balancing technique (i.e. "scrambling") which renders all or most of each individual transmitted unit effectively indistinguishable from random noise.

BACKGROUND OF THE INVENTION

In an Ethernet network, all nodes generate frames in the well-known Ethernet format. However, before transmission on the physical medium, the segments of data making up a frame are converted into transmittable units which are specially tailored for the particular transmission medium on which the Ethernet is operating. This segmenting and conversion procedure is called "encoding".

The "64B/66B transmission code" is an encoding scheme used in fiber-based 10 Gigabit per second (Gbps) Ethernet systems and described in detail in the IEEE 802.3-2005 standard. This form of encoding performs the following steps before transmission: it segments the transmittable frames and interframe gap data into units of 8 bytes (64 bits) and encodes some control information (see FIG. 1), then scrambles the 64-bit units to obtain direct current (DC) balance and prepends a 2-byte control header (see FIG. 2). The scrambling step uses a Linear Feedback Shift Register (LFSR) or similar mechanism to render the spectral characteristics of the data transmission quite similar to those of random noise. This situation creates inefficiencies in certain topologies, as described in detail below.

The Demand Assignment Multiple Access (DAMA) is a method for resource management in a data communication medium. DAMA enables attachment of a "headend" node (typically belonging to a service provider) and of a number of "secondary" nodes (typically belonging to service subscribers) to the physical medium (e.g. fiberoptic cable). With DAMA (in conjunction with Time-Division Multiplexing or TDM), the headend node controls which network element is allowed to transmit at a given time.

"DOCSIS", "IEEE 802.16", and "IEEE 802.3 Ethernet in the First Mile" are examples of networking technologies using TDM-based DAMA mechanisms. A control protocol is typically defined for a specific DAMA network to enable the secondary nodes to indicate their transmission bandwidth requirements (i.e. the "demand") to the headend and for the headend to signal the "assignments" of transmission slots. All three of the networking technologies mentioned above use DAMA in a point-to-multipoint (P2MP) topology.

In a P2MP network with TDM-based DAMA, the headend node directly controls the flow of data on the downstream (DS) channel (which is received by all of the secondary nodes). The headend also assigns time slots on the upstream (US) channel to particular secondary nodes for their transmissions, as well as "contention slots" in which a secondary node can transmit spontaneously. The upstream transmission of a secondary node within a TDM slot is referred to as a "burst". The headend device synchronizes its receiver to the incoming signal at the beginning of each burst. Following the end of the burst, the headend device detects that the transmission has completed and resets its receiver in order to detect the next burst.

Additionally, in a P2MP network with TDM-based DAMA, there may exist transmission intervals which are provided by the headend node for new secondary nodes to enter the network. In these intervals (called "discovery" intervals), multiple secondary devices may transmit, although overlapping transmissions may prevent successful reception by the OLT.

An Ethernet Passive Optical Network (EPON) is an Ethernet network implemented on a P2MP topology over fiberoptic media. The headend node is called an Optical Line Terminal (OLT) and a secondary node is called an Optical Network Unit (ONU). As in other P2MP networks, an EPON OLT transmits over a downstream channel received by all ONUs and assigns transmission slots on the upstream channel to specific ONUs based on their indicated needs for transmission bandwidth. Traditional Ethernet networking technology is oriented to either shared-media (half-duplex Ethernet) or point-to-point media (full-duplex Ethernet). With the introduction of P2MP architecture and DAMA to Ethernet, Ethernet protocols began to be updated for operation in so-called "burst mode".

The 10-Gigabit-per-second Ethernet Passive Optical Network (10G-EPON) is a revision of the EPON P2MP access link technology. 10 G-EPON incorporates a higher bit rate as well as the 66 bit block encoding mechanism (with scrambling of the 64 bit data payload) described above.

A problem arises in a system which uses an encoding scheme in which the data payload is scrambled. With such an encoding scheme, it is difficult for the data receiver to determine if the transmission is still in progress—because there are no characteristics to differentiate the scrambled data from the noise that follows the data.

As a consequence, in order to determine when to reset its receiver the OLT must either: a) monitor the number of received codewords determined to be invalid after descrambling, or b) monitor the incoming data for invalid information in the non-scrambled portion of each codeword (if such an unscrambled portion exists). The first approach can entail additional latency (especially if Forward Error Correction (FEC) needs to be applied before descrambling). The second approach may (in a channel which tolerates a particular bit error rate) necessitate that a large number of codewords be examined before statistical analysis will support a decision regarding end-of-transmission (as only a few bits of each codeword can be informatively examined).

Consider the case of a scrambled 66 bit block. The first two bits may be 01 or 10, and the rest of the bits are indistinguishable from random noise. Thus exactly half of all randomly occurring 66 bit patterns are legitimate codewords. Moreover, a single bit error in the first two bits can convert a valid codeword to an invalid codeword. Accordingly, in the 10 GBASE-R Ethernet specification, the receiver does not declare loss-of-signal until 16 invalid 2-bit headers have been detected within a range of 64-66 bit blocks (for a worst-case unlock time of 422 ns).

These methods are sometimes sufficient. However, there are some scenarios where reliable, significantly faster detection is required, such as in a P2MP network in which the upstream is shared using burst mode. In particular, for 10 G-EPON, it is desirable that the minimum time between bursts be dominated by the optical components reset time, which may be on the order of 250 ns.

Consequently a new method is needed for the receiver to efficiently detect the end of a transmission in such networks.

SUMMARY OF THE INVENTION

The invention discloses a method for detection of end-of-transmission employing an encoding scheme which uses scrambling or a similar mechanism in conjunction with burst mode upstream multiplexing in a DAMA data network having a headend (e.g. OLT in EPON) and a plurality of secondary nodes (e.g. ONUs in EPON). Following the transmission of data in an appointed timeslot, the secondary nodes transmit a special binary pattern called "End-of-Burst Delimiter" (hereinafter "EBD"). The EBD is long enough (e.g. 198 bits at 10 Gbps) so that the statistical probability of the headend receiver detecting it in the received scrambled data stream (taking into account the necessary tolerance of bit errors) is extremely low. The headend checks for the presence of the EBD in the incoming datastream and resets its receiver upon encountering it.

In the case of a unicast transmit interval, the headend performs an additional step of resetting its receiver after the last permissable transmission time of the burst's allocated transmission slot. This provides robustness in the case of a bit slip or of another error that causes the headend to fail to detect the EBD.

In the case of a multicast (also referred to as "non-unicast" or "shared discovery") transmission interval, the headend performs an additional step of resetting its receiver after the conclusion of a transmission of maximum-length for a multicast transmission interval (e.g. in 10 G-EPON, all transmissions in a multicast interval consist of a single 64-octet frame plus various overhead). This provides robustness in the case of an overlapping transmission from a different secondary node, or another error that causes the headend to fail to detect the EBD.

According to the invention there is provided a method of signaling end-of-transmission on a data communications link that uses scrambling including the steps of: by a transmitting node of the network, appending an EBD binary sequence to burst data; and transmitting the burst data and the EBD over the communication link to a headend of the network.

BRIEF DESCRIPTION OF THE DRAWINGS

The invention is herein described, by way of example only, with reference to the accompanying drawings, wherein:

FIG. 1 shows the format of the 66 bit codewords defined for 10 Gbps Ethernet;

DETAILED DESCRIPTION OF THE INVENTION

The invention provides, in various embodiments, methods of signaling and end-of-transmission detection, for efficient sharing of an upstream channel in burst mode or for other purposes which require fast detection of loss of signal at a receiver. The invention is described in detail and exemplarily for 10 G-EPON using 64B/66B encoding, although it should be clear that it is equally applicable to other networks which employ a P2MP topology together with a coding scheme such as scrambling, which renders unprocessed data payloads effectively indistinguishable from random noise. Such a network might include for example the ITU-T GPON.

In the invention, each ONU in the network is a "burst-delimiting ONU" i.e. an ONU which transmits a special binary sequence (the EBD) subsequent to the final encoded unit of its data transmission. As well, in the invention, an OLT is a "delimiter-detecting OLT", i.e. an OLT which monitors an incoming unicast or multicast data transmission for the EBD and resets its receiver upon detecting it, and which also has other functions for end-of-burst detection as described below. The EBD used by the ONU and OLT is an agreed-upon binary pattern (exemplarily a 2 bit '10' sequence repeated 99 times) which is not scrambled before transmission, and is long enough so that the probability of its random appearance in 64B/66B scrambled data is extremely low (i.e. 198 bit pattern for a 10 Gbps link with BER of $10^{-3}$). Since the scheme disclosed herein enables detection of burst termination within the transmission time of a few 66 bit blocks, the OLT has the ability to schedule the transmission intervals with correspondingly small guard times for efficient upstream utilitization.

Figure 2:
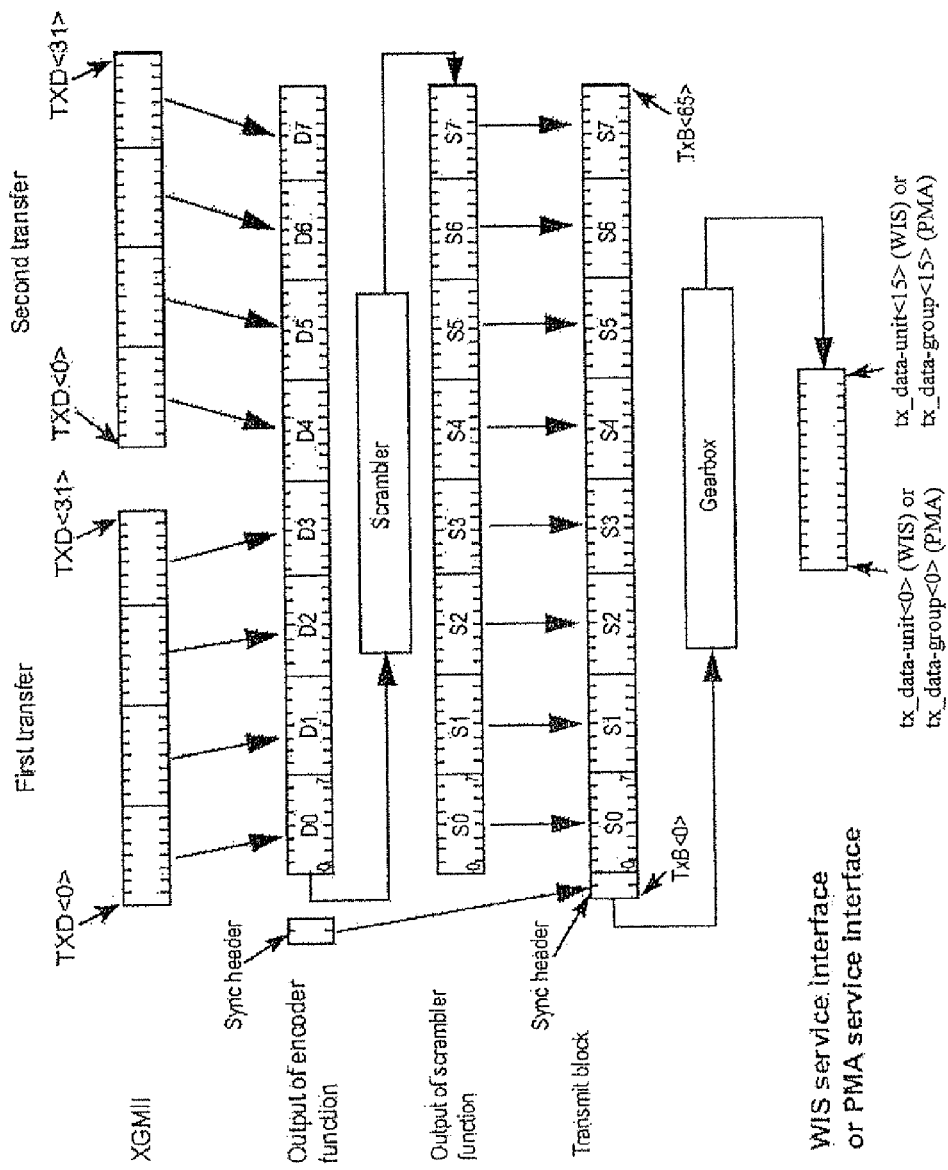
FIG. 2 shows the process in which a transmitting node prepends a 2 bit control header to a scrambled 64 bit payload for DC-balanced transmission.
Figure 3:
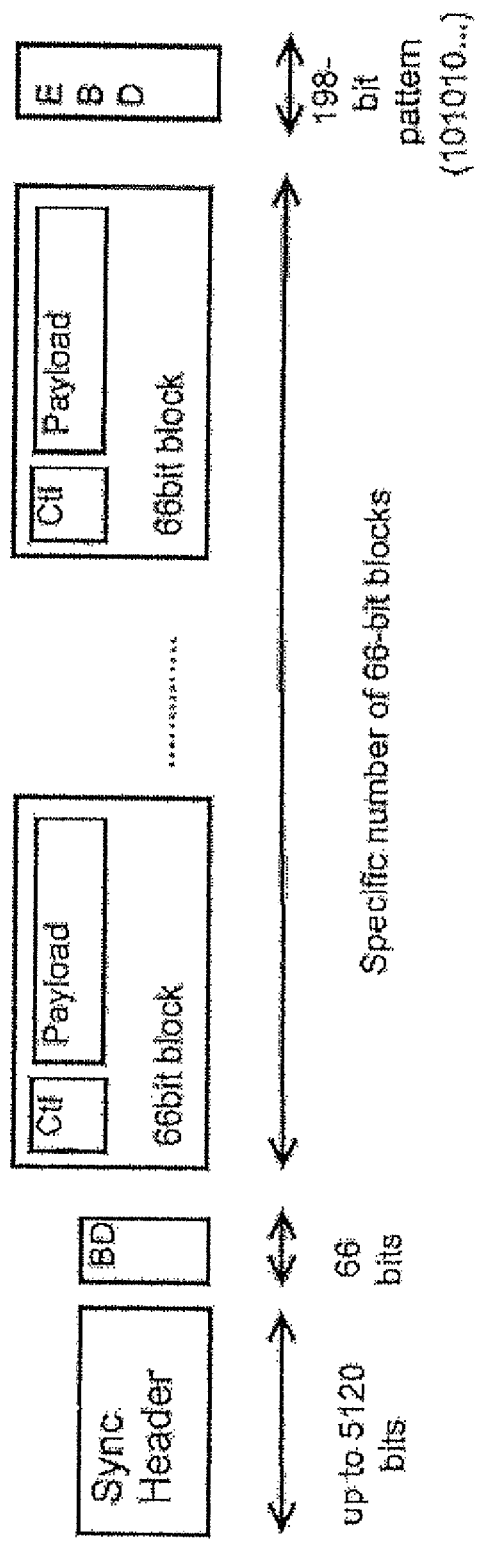
FIG. 3 illustrates the structure of a data burst in 10 G-EPON employing a method of the invention.

FIG. 3 illustrates the structure of a data burst as transmitted from left-to-right in 10 G-EPON employing the invention. First in the order of transmission are headers (labeled "Sync Header" and "BD") for laser stabilization and receiver synchronization. Next is a series of 66-bit blocks—each with a 2-bit control header and scrambled 64-bit payload (FEC parity data is typically present). Finally, an EBD is transmitted last.

Figure 4:
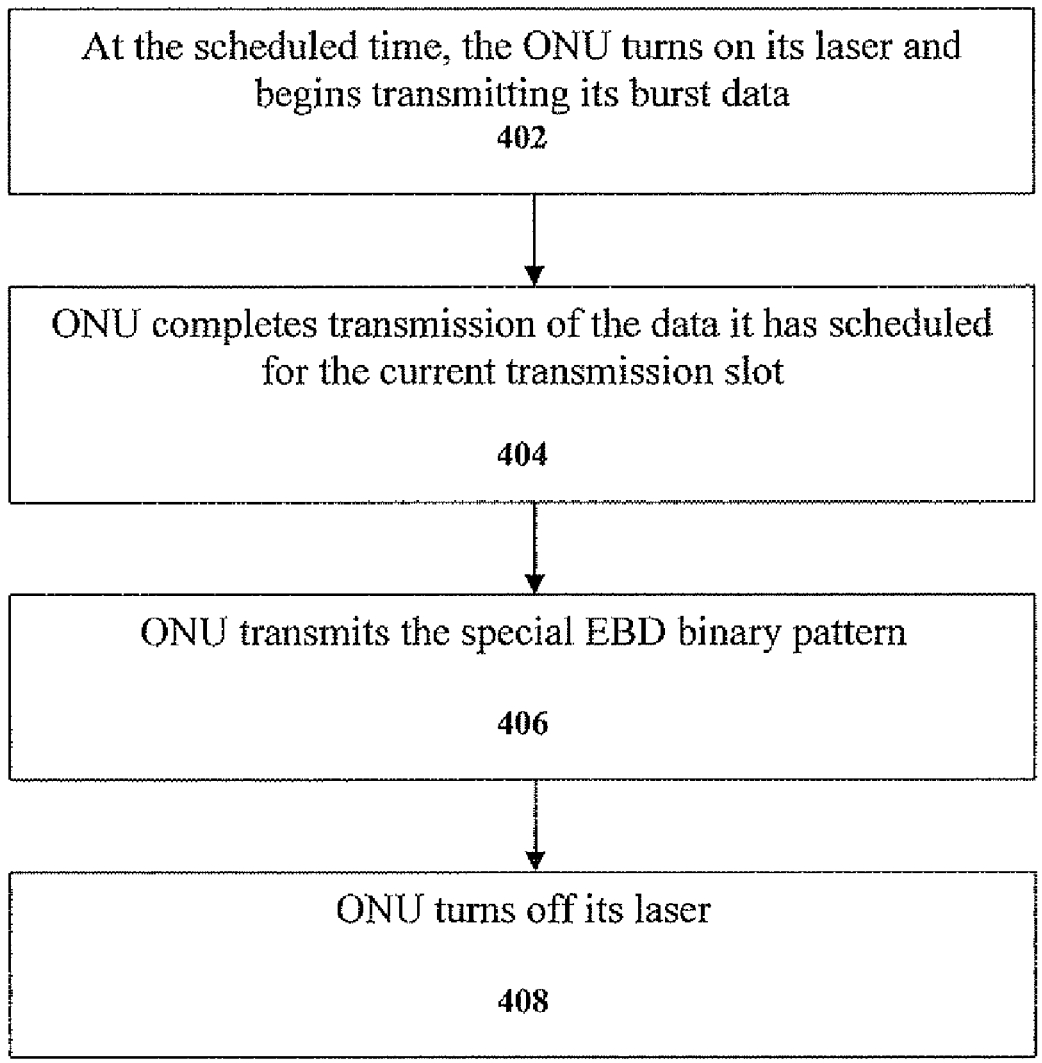
FIG. 4 shows the procedure followed by an ONU in an embodiment of a method of the invention.

The procedure followed by an ONU is outlined in FIG. 4. In step 402, at the assigned time, the ONU turns its laser on and begins its data transmission burst. This may be either a transmission in a dedicated unicast interval or a transmission in the shared "discovery" interval. In step 404, the ONU completes transmission of its data for this burst. In step 406, following the final encoded (and scrambled) block of the data transmission, the ONU transmits the binary EBD pattern (scrambling is not applied to the EBD). Finally, in step 408, the ONU turns off its laser.

Figure 5:
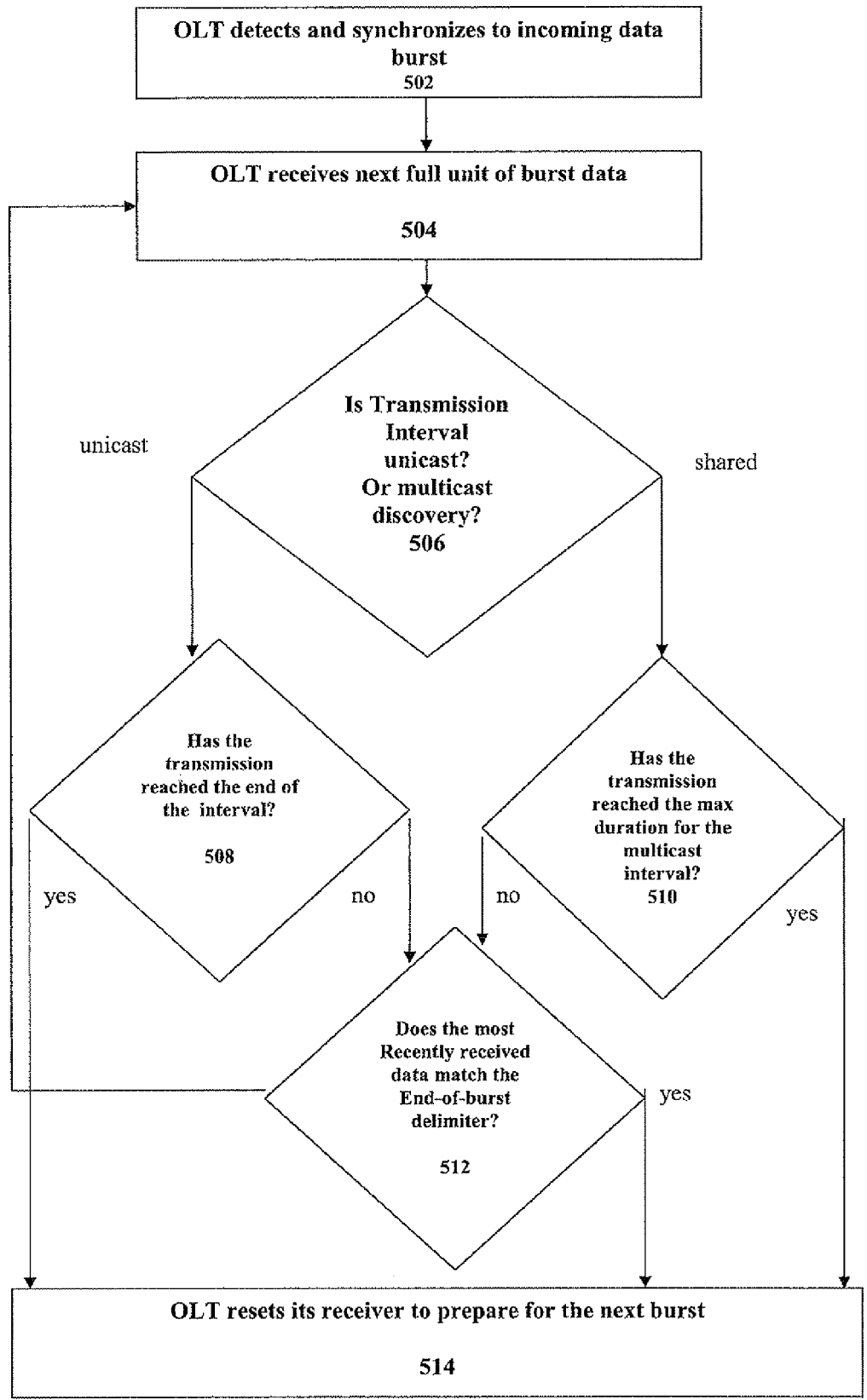
FIG. 5 shows the procedure followed by the OLT in an embodiment of a method of the invention.

The procedure followed by a OLT is outlined in FIG. 5. In step 502, the OLT detects an incoming data transmission burst and synchronizes its receiver to the incoming data stream. In step 504, the OLT processes each incoming block of encoded data according to the 64b66b code (or FEC code, if FEC is employed). In step 506, the OLT checks if the burst is being received in a unicast or multicast interval. If the burst is being received in a unicast transmission interval, then in step 508, in tandem with its processing of each incoming block of data, the OLT compares the current time to the end time of the transmission slot. If the end of the transmission slot has arrived (i.e. if the EBD was not detected due to bit slip or some other exceptional circumstance), the OLT resets its receiver in step 514. If the burst is being received in a non-unicast (i.e. "discovery") transmission interval, then in step 510, in tandem with its processing of each incoming block of data, the OLT counts the number of incoming encoded blocks that have been received in the current burst. The OLT compares the number of blocks transmitted to the maximum number of blocks that may be transmitted in a multicast interval (in 10 G-EPON this maximum number of blocks corresponds to the encoded length of a REGISTER_REQ message). If this maximum number of blocks has been transmitted already (i.e. if either the current block is the last block in the EBD, or else if the EBD was not detected due to interference by a transmission from another ONU or some other exceptional circumstance), the OLT resets its receiver in step 514 to enable it to synchronize on the next subscriber burst.

Finally, in step 512, for both unicast and multicast transmission intervals, the OLT compares the most recently received 3 blocks of incoming data to the EBD pattern. If the incoming data is deemed to be a match of the EBD (i.e. if the last 3 incoming blocks—with scrambled payloads—match the EBD blocks exactly, or else if the number of bit errors that would be necessary to change the EBD pattern into the most recently received 3 incoming blocks is less than a predefined threshold), the OLT resets the receiver in step 514 to enable it to synchronize on the next subscriber burst. Otherwise, the OLT proceeds to process then next block of data in step 504. Steps 508 and 510 require that the receiver has access to the burst scheduling information, which is not always possible in ethernet-based systems. When the invention is embodied in such a system, steps 508 and 510 are simply omitted.

All patents mentioned in this specification are herein incorporated in their entirety by reference into the specification, to the same extent as if each individual patent or patent application was specifically and individually indicated to be incorporated herein by reference. In addition, citation or identification of any reference in this application shall not be construed as an admission that such reference is available as prior art to the present invention. While the invention has been described with respect to a limited number of embodiments, it will be appreciated that many variations, modifications and other applications of the invention may be made. Those skilled in the art will appreciate that the invention can be embodied by other forms and ways, within the scope of the invention. The embodiments described herein should be considered as illustrative and not restrictive. For example, other embodiments of the invention might use a longer or shorter EBD, or choose a different pattern for the EBD than the one given here. Similarly, embodiments may choose to use tolerate more or less bit errors in the EBD when identifying it at reception, or to use an method for identifying the EBD that is different from simply counting the number of matching bits. The transmitted words in an embodiment may have a larger or smaller non-scrambled portion, and error correction (parity) data may or may not be interspersed with the frame data. Though the invention is described in an embodiment of a point-to-multipoint topology in burst mode, it is also applicable in a point-to-point link.

The invention claimed is:

1. A method of signaling end-of-transmission on a data communications link of a point to multipoint (P2MP) network, wherein the data communications link uses scrambling, the method comprising the steps of:
   a) by a transmitting node of the network, appending an end of burst delimiter (EBD) binary sequence to scrambled burst data;
   b) transmitting the scrambled burst data and the EBD over the data communications link to a headend of the network;
   by the headend:
   c) detecting the scrambled burst data;
   d) synchronizing a headend receiver to the scrambled burst data;
   e) checking if the scrambled burst data is unicast interval; and
   f) if unicast interval, comparing a current time to an end time of a transmission slot:
      (i) if the end time is reached, resetting the headend; and
      (ii) while the current time is less than the end time, resetting the headend based on comparing received data to the EBD;
   wherein the communication link is an upstream channel of the P2MP network operated in a burst mode, wherein the P2MP network is an Ethernet passive optical network (EPON), wherein the transmitting node is an optical network unit (ONU) and wherein the headend is an optical line terminal (OLT).

2. The method of claim 1, wherein the EPON is a 10 GEPON using a 64B/66B transmission code and wherein the EBD is a 198 bit pattern.

3. The method of claim 1, wherein the burst mode is transmitted in a mode selected from unicast transmission and multicast transmission.

4. The method of claim 1 wherein the scrambled burst data is variable length.

5. The method of claim 1 further including the step of:
   c) resetting a receiver based on the headend of the network comparing received data to the EBD.

6. The method of claim 5 wherein comparing received data to the EBD is done in tandem with processing the scrambled burst data.

7. A method of signaling end-of-transmission on a data communications link of a point to multipoint (P2MP) network, wherein the data communications link uses scrambling, the method comprising the steps of:
   a) by a transmitting node of the network, appending an end of burst delimiter (EBD) binary sequence to scrambled burst data;
   b) transmitting the scrambled burst data and the EBD over the data communications link to a headend of the network;
   by the headend
   c) detecting the scrambled burst data;
   d) checking if the scrambled burst data is multicast; and
   e) if multicast comparing a first number of blocks received in the scrambled burst data to a second number of blocks required for a maximum length discovery window transmission:
      (i) if the first and second numbers are equal, resetting the headend; and
      (ii) while the first number of blocks received is less than the second number of blocks, resetting the headend based on comparing received data to the EBD;
   wherein the communication link is an upstream channel of the P2MP network operated in a burst mode, wherein the P2MP network is an Ethernet passive optical network (EPON), wherein the transmitting node is an optical network unit (ONU) and wherein the headend is an optical line terminal (OLT).

* * * * *